United States Patent [19]
Maki et al.

[11] 3,913,493
[45] Oct. 21, 1975

[54] SYSTEM FOR PROPELLING TRAIN BY LINEAR SYNCHRONOUS MOTOR

[75] Inventors: Naoki Maki, Tokaimura; Hironori Okuda, Hitachi; Takashi Tsuboi, Katsuta; Takao Miyashita, Mito; Takao Takahashi, Hitachi, all of Japan

[73] Assignee: Hitachi, Ltd., Japan

[22] Filed: Nov. 15, 1973

[21] Appl. No.: 415,952

[30] Foreign Application Priority Data
Nov. 25, 1972 Japan.............................. 47-118211

[52] U.S. Cl................... 104/148 SS; 104/148 MS; 104/148 LM
[51] Int. Cl.² ........................................ B61B 13/08
[58] Field of Search... 104/148 LM, 148 MS;148 SS

[56] References Cited
OTHER PUBLICATIONS
Powell et al., The Linear Synchronous Motor and High Speed Ground Transport, Energy Conversion Engineering Conference, Boston, Mass., August, 1971, p. 118.

Primary Examiner—M. Henson Wood, Jr.
Assistant Examiner—Reinhard J. Eisenzopf
Attorney, Agent, or Firm—Craig & Antonelli

[57] ABSTRACT

A system for propelling a train by a linear synchronous motor comprising a group of propelling coils disposed in pairs along a train track on the ground on opposite sides of the center line of the train track and opposite to field coils mounted on the vehicle with a predetermined gap defined therebetween, said coil pairs in the propelling coil group being connected in parallel respectively to constitute a group of short-circuited coil units which interact electro-magnetically with the field coils to stabilize the vehicle against rolling movement.

7 Claims, 13 Drawing Figures

SYSTEM FOR PROPELLING TRAIN BY LINEAR SYNCHRONOUS MOTOR

FIELD OF THE INVENTION

This invention relates to improvements in super-high speed trains propelled by linear synchronous motors while being levitated from the ground. The present invention will be described with reference to the accompanying drawings while comparing the same with a prior art train of this kind.

DESCRIPTION OF THE PRIOR ART

Conventional driving means including driving motors, rails and wheels are impossible to use with super-high speed train rated at a very high speed of the order of 500 Km per hour due to factors including the abrupt increase in the running resistance, reduction in the adhesion between the rails and the wheels, and impossibility of the supply of electrical power to running vehicles. For the purpose of realization of such a super-high speed train, a system has been proposed in which vehicles are levitated from the ground by compressed air or magnetic force and are propelled by a linear motor.

An example of such a super-high speed train is schematically shown in vertical section in FIG. 1. In the proposed system shown in FIG. 1, superconducting coils 2 mounted on a vehicle 1 produce magnetic flux which interacts with current flowing through stabilizing coils 4 (or guiding coils), propelling coils 5 (which are commonly of the rectangular concentrated winding type) and levitating coils 6 supported by a foundation 3 of concrete disposed on the ground so as to provide a stabilizing force against rolling or lateral movement, propelling force and levitating force. The propelling coils 5 are energized by an external three-phase a.c. power supply to produce travelling waves of magnetic flux for providing the propelling force.

FIG. 2 shows the arrangement of one of the superconducting coils 2 mounted on the vehicle 1 relative to the associated stabilizing coil 4 and propelling coil 5 disposed on the ground. The superconducting coil 2 mounted on the vehicle 1 is housed within a vessel 9 filled with liquid helium 8 and an outer casing 11 surrounds this vessel 9 through a layer of heat insulator 10 to constitute a superconducting magnet 7. The stabilizing or guiding coil 4 is embedded in the concrete foundation 3 on the ground and the propelling coil 5 is disposed outside of the stabilizing coil 4 with an anchoring member 12 interposed therebetween. The propelling coil 5 and the anchoring member 12 are firmly secured to the concrete foundation 3 by means of fastening members 13 and bolts 14.

The stabilizing force imparted to the vehicle 1 during running varies in proportion to the center-to-center distance between the stabilizing coil 4 disposed on the ground and the superconducting coil 2 mounted on the vehicle 1 as shown in FIG. 3. It has been found by computation that the stabilizing force can be almost doubled when the center-to-center distance above described is reduced from, for example, to 20 cm from 30 cm. It is therefore desirable to minimize the center-to-center distance between the stabilizing coil 4 and the superconducting coil 2. However, the superconducting coils 2 mounted on the vehicle 1 must have a sufficient thickness in order to ensure thermal insulation and mechanical strength, and a required center-to-center distance must be maintained between the superconducting coils 2 and the coils on the ground (the stabilizing coil 4 and the propelling coil 5) in order to ensure free running of the levitated vehicle 1. Therefore, it has been considered difficult to increase the stabilizing force for these reasons.

Further, an attempt has been made to reduce the center-to-center distance between the superconducting coil 2 and the stabilizing coil 4 on the ground by mounting the stabilizing coil 4 on the external surface of the propelling coil 5. However, this arrangement is objectionable in that the center-to-center distance between the propelling coil 5 disposed on the ground and the superconducting coil 2 mounted on the vehicle 1 is inevitably increased resulting in an undesirable reduction of the propulsive efficiency.

SUMMARY OF THE INVENTION

It is therefore a primary object of the present invention to provide an economical system for propelling a super-high speed train by a linear synchronous motor in which the stabilizing force can be increased without reducing the propulsive efficiency and the number of coils disposed on the ground can be reduced to half of the number conventionally required.

The present invention which attains the above object is featured by the fact that each pair of propelling coils disposed opposite to each other on the ground are connected in parallel to form a closed loop so that the propelling coils act also as stabilizing or guiding coils thereby eliminating the stabilizing or guiding coils required previously on the ground.

DESCRIPTION OF THE PREFERRED EMBODIMENTS

Figure 4:
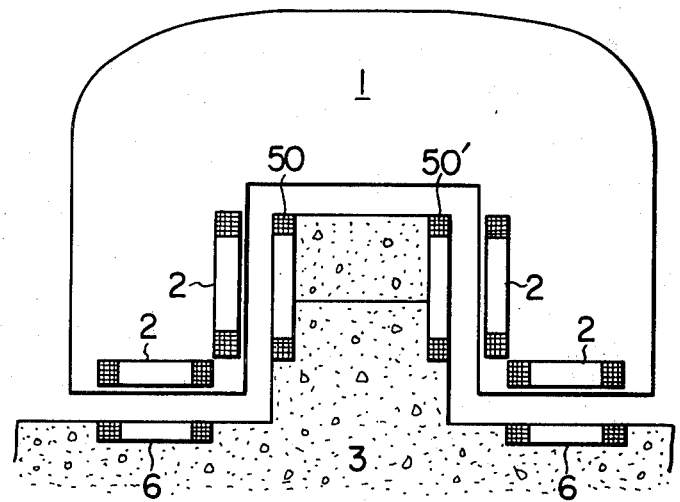
FIG. 4 is a schematic vertical section of a super-high speed train propelled by a linear synchronous motor embodying the present invention.

Referring to FIG. 4 showing an embodiment of the present invention, superconducting coils 2 mounted on a vehicle 1 produce magnetic flux which interacts with current induced in levitating coils 6 (in the form of short-circuited coils or conductive sheets) disposed in a concrete foundation 3 on the ground so as to provide the levitating force. Pairs of combined propelling and stabilizing coils 50 and 50' disposed in the concrete foundation 3 on the ground on opposite sides of the vertical center line of the concrete foundation 3 are energized by an external three-phase a.c. power supply to provide the propelling force by interaction with the magnetic flux produced by the superconducting coils 2. When the vehicle 1 is displaced in a transverse direction, circulating current flows through a circuit consisting of parallel connections of the pairs of the combined propelling and stabilizing coils 50 and 50' and interacts with the magnetic flux produced by the superconducting coils 2 to provide a stabilization force against transverse displacement.

Figure 5:
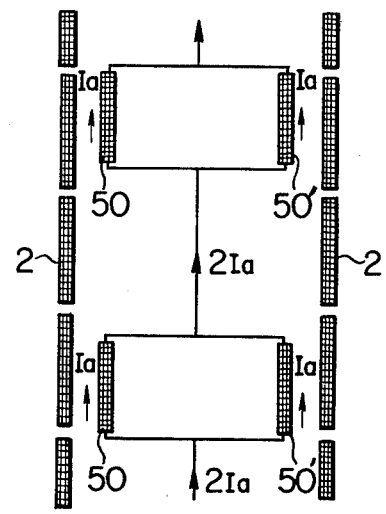
FIG. 5 shows the manner of electrical connection between propelling coils to constitute combined propelling and stabilizing coil units and the relative position between these coil units and superconducting coils in the system according to the present invention.

FIG. 5 is a top plan view of parts of the arrangement shown in FIG. 4 and shows the position of the combined propelling and stabilizing coil units corresponding to one phase relative to the position of the superconducting coils 2. Referring to FIG. 5, each combined propelling and stabilizing coil unit comprises a parallel connection of a pair of propelling coils 50 and 50' disposed on opposite sides of the track, and a multiplicity of such combined propelling and stabilizing coil units are disposed along the advancing direction of the vehicle 1 and are connected in series or in parallel to be supplied with electrical power from the power supply. When no transverse displacement occurs in the vehicle 1, the same voltage is induced in the coils 50 and 50' and no circulating current appears. Therefore, current $2Ia$ supplied from the power supply for the purpose of propulsion is equally divided into halves and current $Ia$ flows through each of these coils 50 and 50'. The phase of this current is substantially opposite to that of the induced voltage so that the propelling force can be effectively produced.

Figure 1:
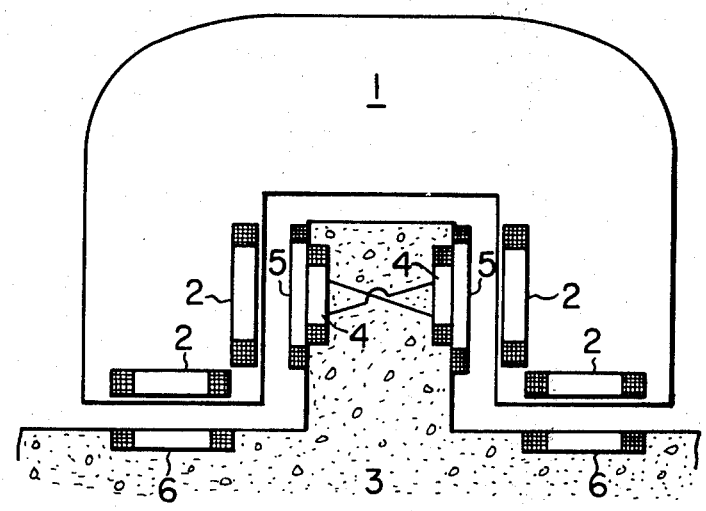
FIG. 1 is a schematic vertical section of a super-high speed train propelled by a prior art linear synchronous motor.
Figure 2:
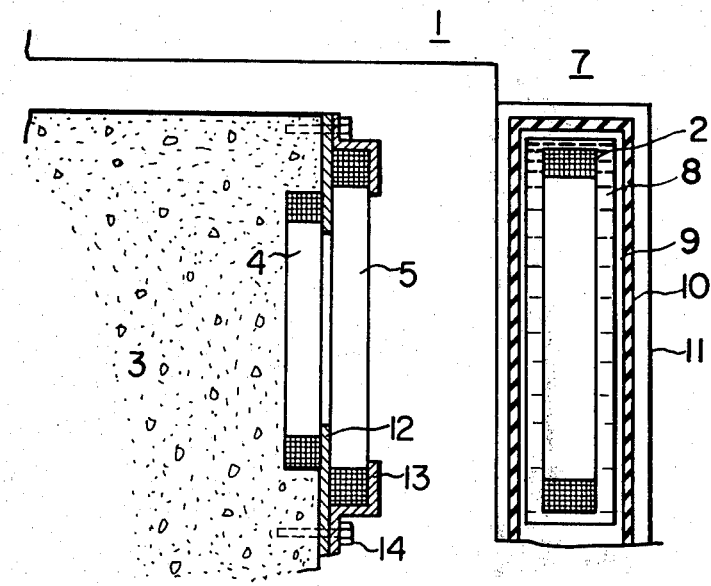
FIG. 2 is a partial detail view of FIG. 1 to show various coils mounted on the vehicle and disposed on the ground.
Figure 3:
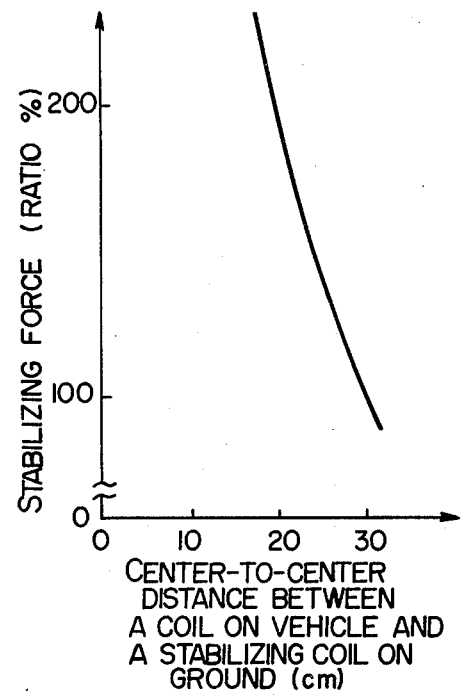
FIG. 3 is a graph showing variations of the stabilizing force relative to the center-to-center distance between a superconducting coil mounted on the vehicle and a stabilizing coil disposed on the ground.
Figure 9:
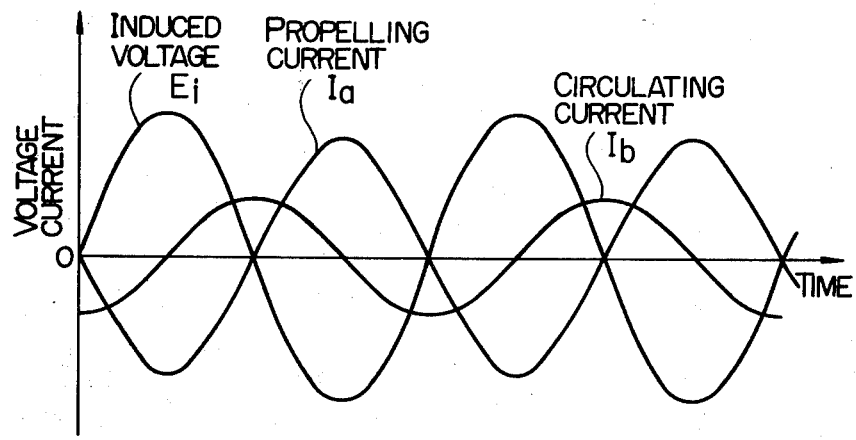
FIGS. 6 to 9 show how the propelling and stabilizing operation is attained by the combined propelling and stabilizing coil unit employed in the present invention.
Figure 6:
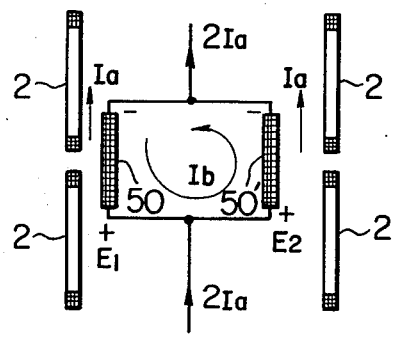
Figure 7:
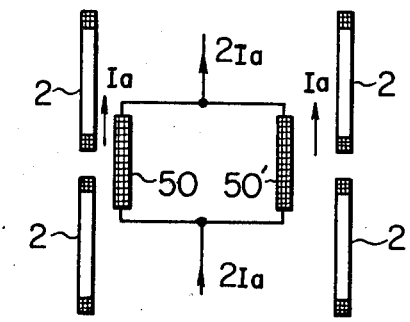
Figure 8:
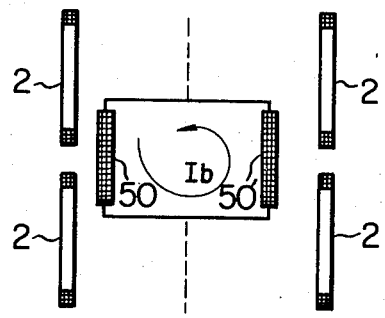

FIG. 6 shows the relation between the position of the superconducting coils 2 and that of the combined propelling and stabilizing coil unit consisting of the propelling coils 50 and 50' when, for example, the vehicle 1 is displaced to the right. In this case, the gap between the right-hand propelling coil 50' and the associated superconducting coils 2 is increased, while the gap between the left-hand propelling coil 50 and the associated superconducting coils 2 is decreased. Therefore, voltage $E_1$ induced in the left-hand propelling coil 50 is higher than voltage $E_2$ induced in the righthand propelling coil 50' and the differential voltage $Ei = E_1 - E_2$ produces a circulating current $Ib$ in the combined propelling and stabilizing coil unit consisting of the parallel connection of the propelling coils 50 and 50'. Since this short-circuit coil unit acts substantially as a reactance element, the phase of the circulating current $Ib$ lags by about 90° behind that of the induced voltage $Ei$ as shown in FIG. 9. On the other hand, the current $Ia$ is still continuously supplied from the power supply to the combined propelling and stabilizing coil unit and this current $Ia$ overlaps the circulating current $Ib$. However, these currents $Ia$ and $Ib$ do not substantially interfere with each other due to the fact that they are about 90° out of phase. These currents may be separately considered as shown in FIGS. 7 and 8. FIG. 7 illustrates the case in which the combined propelling and stabilizing coil unit serve merely as propelling coils and the operation thereof is entirely similar to the operation of the conventional propelling coils 5 shown in FIG. 1. FIG. 8 illustrates the case in which the combined propelling and stabilizing coil unit serves merely as stabilizing coils and the operation thereof is entirely similar to the operation of the conventional stabilizing coils 4 shown in FIGS. 1 and 2. Thus, the combined propelling and stabilizing coil unit can provide the dual function of the propelling coils and stabilizing coils. One may fear that the sectional area of the coils forming the combined propelling and stabilizing coil unit may be slightly increased because the circulating current for stabilization flows therethrough in addition to the current for propulsion. However, due to the fact that this circulating current flows merely through the coils opposed by the moving vehicle and the flow of the circulating current occurs only when the vehicle is displaced in the transverse direction, ohmic losses due to the circulating current are small and any increase in the coil sectional area is substantially unnecessary.

FIGS. 10 to 13 show other embodiments of the present invention.

Figure 10:
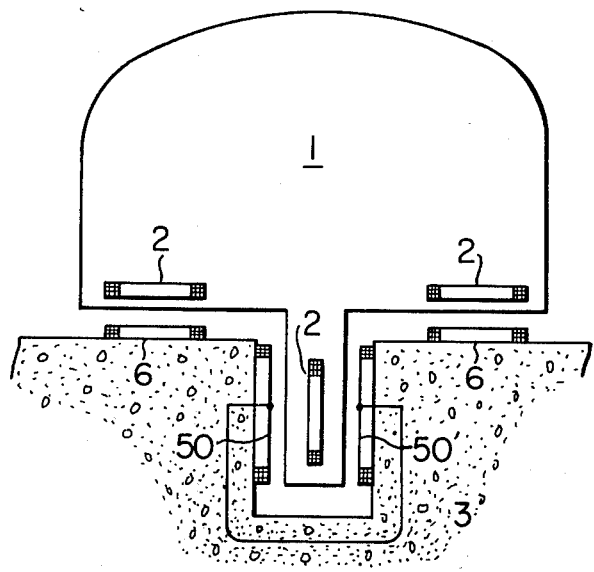
FIGS. 10 to 13 are schematic vertical sections of other embodiments of the present invention.

Referring to FIG. 10, superconducting coil or field coils 2 are disposed vertically on a vehicle 1, and pairs of vertical propelling coils 50 and 50' are disposed on the ground on opposite sides of the superconducting coils 2 and are connected in parallel to constitute short-circuited coil units so as to carry out both the propelling operation and the stabilizing operation.

Figure 11:
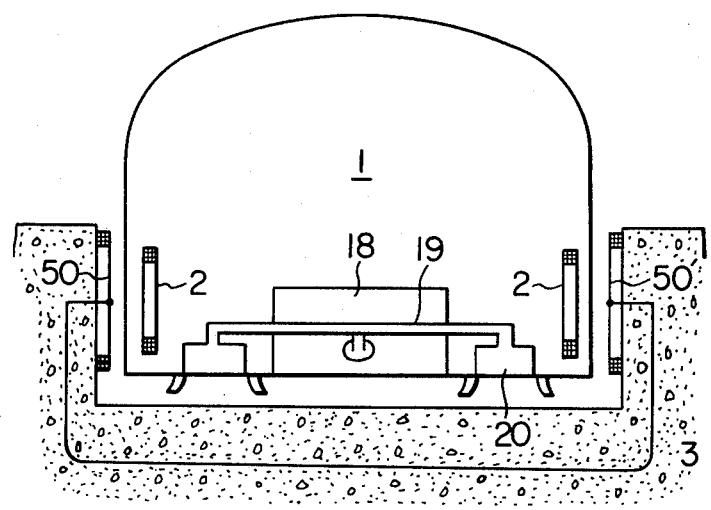

Referring to FIG. 11, superconducting coils 2 are disposed vertically adjacent to opposite transverse marginal end portions of a vehicle 1, and pairs of vertical propelling coils 50 and 50' are disposed on the ground opposite to the superconducting coils 2 and are connected in parallel to constitute short-circuited coil units having an additional function of stabilizing coils. Levitation of the vehicle 1 is attained by compressed air supplied from an air compressor 18 through a conduit 19 and air discharge ports 20.

Figure 12:
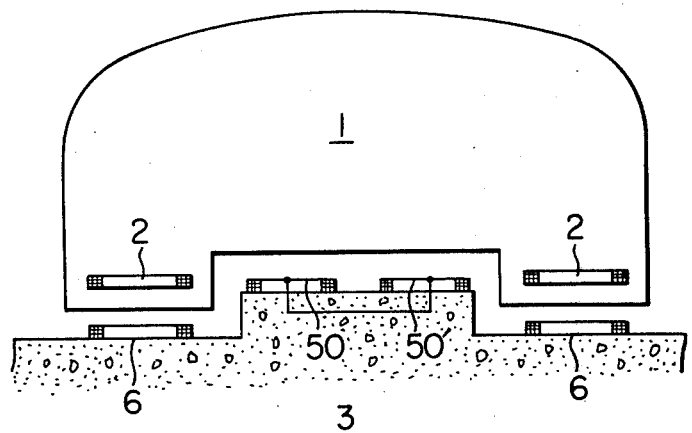
Figure 13:
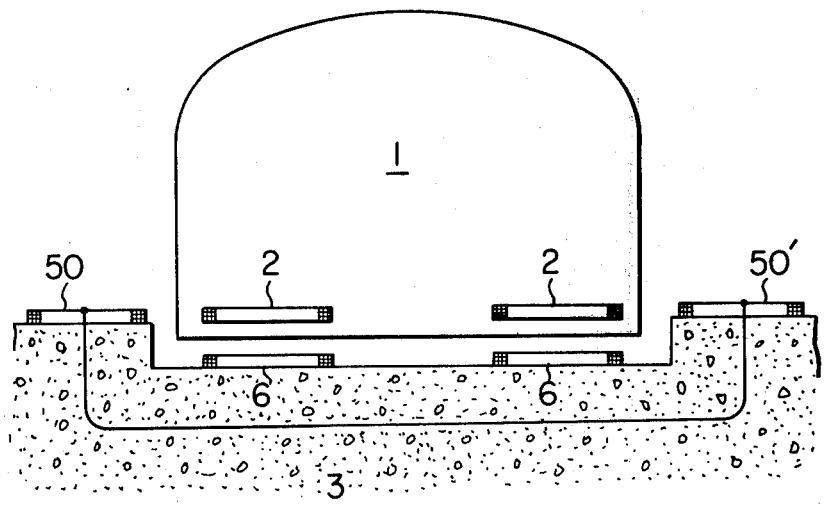

Referring to FIG. 12, superconducting coils 2 are disposed horizontally adjacent to opposite transverse marginal end portions of a vehicle 1, and pairs of horizontal propelling coils 50 and 50' are disposed on the ground inside the superconducting coils 2 and are connected in parallel to constitute short-circuited coil units. FIG. 13 shows an arrangement generally similar to that shown in FIG. 12 except that propelling coils 50 and 50' are disposed outside the superconducting coils 2. In both these cases, it is apparent that both the propelling operation and the stabilizing operation can be attained.

The embodiments above described have referred to an arrangement in which superconducting coils are mounted on a vehicle opposite to propelling coils. However, conventional magnet means such as electromagnets or permanent magnets may be similarly effectively employed. Further, it is apparent that, even when the pitch of the propelling coils and the number of phase of the power supply are changed or when the type of winding of the propelling coils is changed to the distributed winding, single layer winding, multiplex winding and any other winding, the effect similar to that above described can be obtained by connecting each pair of opposite propelling coils in parallel to constitute a short-circuited coil unit.

It will be understood from the foregoing description that the present invention provides a system in which each pair of opposite propelling coils are connected in parallel to constitute a short-circuited coil unit so that the propelling coils can serve the dual function of propulsion and stabilization. Thus, the system does not require conventional stabilizing coils and is very economical. In the prior art arrangement, the propelling coils must be mounted on the stabilizing coils and a troublesome mounting operation is required. According to the present invention, however, mounting of the combined propelling and stabilizing coil units is only necessary and such units can be simply mounted. Further, the stabilizing force is greater than heretofore and improved performance can be obtained due to the fact that the gap between the superconducting coils and the combined propelling and stabilizing coil units is less than the gap between the superconducting coils and the stabilizing coils in the prior art arrangement.

We claim:

1. A system for propelling a train by a linear synchronous motor comprising a vehicle to be propelled along a track on the ground, first magnetic field generating means mounted on said vehicle, a group of propelling coils electro-magnetically coupled to said first magnetic field generating means for imparting propelling force to said vehicle, means for levitating said vehicle from the ground, and an a.c. power supply disposed on the ground for supplying electrical power to said propelling coil group, wherein said propelling coils are disposed in pairs along said track on opposite sides of the center line of said track, and said propelling coils in individual pairs are connected in parallel to form a first group of short-circuited coil units.

2. A system as claimed in claim 1, wherein said vehicle levitating means comprises second magnetic field generating means disposed in pairs on said vehicle on opposite sides of the center line of said vehicle, and a second group of short-circuited coil units electromagnetically coupled to said second magnetic field generating means, said short-circuited coils in said second group being disposed in pairs along said track on opposite sides of the center line of said track.

3. A system as claimed in claim 1, wherein a circulating current is induced in a pair of said propelling coils connected in parallel when the longitudinal center line of said vehicle is displaced laterally from said center line of said track, whereby said circulating current acts to provide a stabilization force acting against the lateral displacement of said vehicle.

4. A system for propelling a train by a linear synchronous motor comprising a vehicle to be propelled along a track on the ground, first magnetic field generating means mounted on said vehicle, a group of propelling coils electromagnetically coupled to said first magnetic field generating means for imparting propelling force to said vehicle, means for levitating said vehicle from the ground, and an a.c. power supply disposed on the ground for supplying electrical power to said propelling coil group, wherein said propelling coils are disposed in pairs along said track on opposite sides of the center line of said track, said propelling coils in individual pairs are connected in parallel to form a first group of short-circuited coil units and said vehicle levitating means comprises a second group of short-circuited coil units electromagnetically coupled to said first magnetic field generating means, said short-circuited coils in said second group being disposed in pairs along said track on opposite sides of the center line of said track.

5. A system as claimed in claim 4, wherein a circulating current is induced in a pair of said propelling coils connected in parallel when the longitudinal center line of said vehicle is displaced laterally from said center line of said track, whereby said circulating current acts to provide a stabilization force acting against the lateral displacement of said vehicle.

6. A system for propelling a train by a linear synchronous motor comprising a vehicle to be propelled along a track on the ground, first magnetic field generating means disposed in pairs on said vehicle on opposite sides of the center line of said vehicle, a group of propelling coils disposed in pairs along said track on opposite sides of the center line of said track so as to be spaced apart from said first magnetic field generating means by a predetermined distance, said propelling coils in individual pairs being connected in parallel to form a first group of short-circuited coil units, second magnetic field generating means disposed in pairs on said vehicle on opposite sides of the center line of said vehicle, a second group of short-circuited coil units disposed in pairs along said track on opposite sides of the center line of said track so as to be spaced apart from said second magnetic field generating means by a predetermined distance, and an a.c. power supply disposed on the ground for supplying electrical power to said propelling coil group.

7. A system as claimed in claim 6, wherein a circulating current is induced in a pair of said propelling coils connected in parallel when the longitudinal center line of said vehicle is displaced laterally from said center line of said track, whereby said circulating current acts to provide a stabilization force acting against the lateral displacement of said vehicle.

* * * * *